United States Patent [19]
Fink et al.

[11] 3,979,349
[45] Sept. 7, 1976

[54] DISPERSIONS OF WATER-SOLUBLE POLYMERS AND METHODS FOR MAKING AND USING THE SAME

[75] Inventors: Herbert Fink, Bickenbach; Horst Pennewiss, Darmstadt-Neu-Kranichstein; Hermann Plainer, Darmstadt; Hans Trabitzsch, Seeheim; Josef Frieser, Darmstadt-Weiterstadt; Juergen Masanek, Pfungstadt, all of Germany

[73] Assignee: Rohm GmbH, Darmstadt, Germany

[22] Filed: May 1, 1974

[21] Appl. No.: 466,083

[30] Foreign Application Priority Data
May 7, 1973 Germany.......................... 2322883

[52] U.S. Cl. ............. 260/29.6 RW; 260/29.6 WB; 260/29.6 WQ; 260/29.6 HN; 260/29.6 PM
[51] Int. Cl.$^2$......................................... C08L 33/08
[58] Field of Search........... 260/29.6 RW, 29.6 WQ, 260/29.6 WB, 29.6 HN, 29.6 PM

[56] References Cited
UNITED STATES PATENTS

| | | | |
|---|---|---|---|
| 3,244,658 | 4/1966 | Grosser et al. ............. | 260/29.6 RW |
| 3,284,393 | 11/1966 | Vanderhoff et al............ | 260/29.6 H |
| 3,296,167 | 1/1967 | Turner et al. ............... | 260/29.6 RW |
| 3,322,712 | 5/1967 | Gardner et al. ............. | 260/29.6 RW |
| 3,445,441 | 5/1969 | Rushton ...................... | 260/29.6 HN |
| 3,624,019 | 11/1971 | Anderson et al. ............. | 260/29.6 H |
| 3,691,124 | 9/1972 | Barron ........................ | 260/29.6 WQ |
| 3,711,435 | 1/1973 | Hammer et al. ............. | 260/29.6 HN |
| 3,801,524 | 4/1974 | Parker ........................ | 260/29.6 WB |
| 3,806,485 | 4/1974 | Fisque......................... | 260/29.4 UA |

*Primary Examiner*—M. J. Welsh
*Attorney, Agent, or Firm*—Curtis, Morris & Safford

[57] ABSTRACT

Polymer dispersions in which an aqueous phase comprising a water-soluble polymer is dispersed in an organic liquid in the presence of a polymeric water-in-oil type dispersing agent containing salt-forming basic nitrogen atoms. When the dispersion is mixed with water in the presence of an acid, which acid may be present in the aqueous or organic phase of the dispersion or added separately, the dispersing agent transforms into an oil-in-water type, the previously dispersed polymer dissolves in the water, and the previously continuous organic phase is dispersed in the water.

Methods of making such polymer dispersions.

Methods of forming aqueous solutions of water-soluble polymers by combining such dispersions with water in the presence of an acid.

12 Claims, No Drawings

DISPERSIONS OF WATER-SOLUBLE POLYMERS AND METHODS FOR MAKING AND USING THE SAME

The present invention relates to dispersions of water-soluble polymers and to methods for making and using such dispersions.

Water-soluble polymers play an important technical role as sizing agents, thickening agents, flocculating agents, and the like. The aqueous solutions of these polymers are highly viscous even at moderate concentrations, so that they are manipulable only at very low concentrations, especially when the polymers are of extremely high molecular weights. Thus, it is not convenient to market these polymers in dissolved form. Rather, they are mostly dried to form a finely-divided solid product which must be dissolved in water prior to use. The process of solution in many cases takes place only very slowly, even with good stirring, and this is particularly so if the dry product has a tendency to form lumps on stirring with water.

In order to avoid these disadvantages, it has already been proposed in U.S. Pat. No. 3,282,874 to suspend the watersoluble polymers in organic liquids which are immiscible with water and subsequently to combine the suspension with water, with vigorous stirring, whereby the polymer is dissolved without the formation of lumps. In order to stabilize the suspension of the polymer in the organic liquid for long storage times, an emulsifying agent of the water-in-oil type is added.

The process of contacting such a stable dispersion or emulsion with a water phase so that the water-soluble polymer dissolves in the water is a rather protracted one. This is true particularly for very finely-divided dispersions. Thus, it has been proposed in German Offenlegungsschrift 2,154,081 to add an oil-in-water emulsifier to the aqueous phase, whereby the dispersion of the water-soluble polymer or the emulsion of the polymer solution in the organic phase is inverted so that the polymer enters the water phase and the originally continuous organic phase is emulsified. In this manner it is possible to transfer a water-soluble polymer from an organic dispersion or emulsion to an aqueous solution in a short period of time. Nevertheless, the consumption of emulsifying agents in this process is considerable.

The present invention has as an object the dispersion of a water-soluble polymer, in the form of a concentrated aqueous solution, in an organic phase and conversion or transfer of the polymer into a dilute aqueous solution thereof in a short time without the need for large amounts of auxiliary chemicals which pollute the waste water.

This object has been achieved according to the present invention with polymer dispersions comprising A. a continuous organic phase which is immiscible or only partially miscible with water, B. a finely-divided polymer phase comprising a water-soluble high molecular weight compound which is dissolved in water or which is swollen with water, and C. a water-in-oil dispersing agent, soluble in the organic phase, which is a vinyl or vinylidene polymer comprising a. 10 – 50 percent by weight of vinyl or vinylidene monomers having a basic nitrogen atom, b. 90 – 50 percent by weight of vinyl or vinylidene monomers having an alkyl side chain containing at least 6 carbon atoms, or of a mixture containing such monomers with up to an equal amount of other water-insoluble vinyl or vinylidene monomers.

Optionally, other surface active agents may be present with this dispersing agent. However, the hydrophilic-lypophilicbalance value (HLB-value) of the total dispersing component should be below 6 at a pH value above 4 and greater than 8 at a pH value below 2.

Such a dispersion is storage stable for a long period of time and is so viscous that it does not settle but nevertheless can still be passed through pipes. If the dispersion is brought together with an acid aqueous phase, the dispersing agent is converted as a result of salt formation from the water-in-oil type to the oil-in-water type. The HLB-value in this case rises above 8. The suspension thus becomes unstable and inverts. The previously suspended particles of the polymer phase go into the continuous aqueous phase while the previously continuous oil phase becomes suspended or emulsified. Uniform solution of the water-soluble polymer in the aqueous phase is achieved the more rapidly the greater is the water content of the polymer phase which is already in the dispersion.

It is most advantageous to distribute the organic dispersion with stirring in a sufficiently large amount of water and then to acidify. However, the acid necessary for conversion of the dispersing agent can also be present in the dispersion itself, either in the organic phase, or in the polymer phase, or in both phases. Surprisingly, the stability of the dispersion is not influenced by the presence of the acid.

The present invention makes possible the conversion of water-soluble polymers of almost any kind into aqueous solutions thereof. The polymers can be non-ionic polymers such as polyacrylamide, polyvinyl pyrrolidone, polyvinyl alcohol, poly(hydroxyalkyl)-acrylates or -methacrylates, or water-soluble copolymers of the corresponding monomer components of the aforementioned homopolymers with each other or with limited amounts of non-water-soluble monomers. Further, cellulose ethers and the like may be involved. Also, salt-like polymers can be brought into solution according to the present invention and, to be sure, both those of the cationic type, such as poly(methacryloxyethyl)-trimethylammonium chloride, as well as those of the anionic type, such as the sodium salts of polyvinyl sulfonic acid or of polystyrene sulfonic acid. Such salt-like polymers are in salt form throughout the entire pH range and undergo no change in their solubility state on alteration of the pH value.

On the other hand, there are other polymers which are in the salt form only at particular pH values, for example polyacrylic acid which forms salts in the alkaline region. In this case, the nitrogen atoms of the vinyl polymer dispersing agent must be relatively strongly basic so that they are converted into the corresponding salt form on the addition of acid without the development of a strong buffer action by the suspended polymer salt. A limited buffer effect of the polymer can be compensated for by the addition of a larger amount of acid than corresponds with the number of equivalents of nitrogen groups of the dispersing agent. If the polymer phase contains a partially neutralized polymer, i.e. a polymer containing carboxyl or carboxylate groups, a reduced buffer action of the polymer phase is observed.

As examples of polymers which form salts only in the acid region, poly(dimethylaminoethyl)-acrylate and -methacrylate can be mentioned. Polymers of this type also exert a buffer effect, i.e. they require more acid than is equivalent to the basic nitrogen groups of the dispersing agent to bring the HLB-value of the latter into the region of the oil-in-water emulsifiers.

The salts of these polymers react acidly, but evidently effect no transformation of the dispersing agent into the oil-in-water type, since stable water-in-oil dispersions are in fact obtained. Apparently, neutralization reactions between the acid polymer phase and the surrounding dispersing agent are restricted to the boundary layer between the phases and do not affect the principal portion of the dispersing agent. For this reason, it is also possible that the acid necessary for the transformation of the dispersing agent into the oil-in-water type can be present in a considerable amount, or in many cases completely, in the polymer phase, even if the acid in the phase is not bound to the polymer.

The concentration of the polymer in the suspended aqueous phase is generally chosen as high as possible, for example 50 – 60 percent by weight. As a rule, these "solutions" do not form any aqueous droplets, but rather more or less solid swollen gel particles.

As the organic phase of the dispersions according to the invention, low viscosity oils, e.g. liquid hydrocarbons and chlorohydrocarbons, are preferred because they permit a good dispersion of the particles of the polymer phase. The density difference between the aqueous polymer phase and the oil phase should be as small as possible in order to insure a high stability of the dispersion. Oils of higher density are therefore preferred. The density of a hydrocarbon or other oil phase can be reduced by the addition of chlorohydrocarbons.

Although the dispersions of the invention may comprise from 10 to 70 parts by weight of oil phase, the oil portion of the dispersion is kept as small as possible. As a rule, a volume fraction of from 15 to 20 percent of the total dispersion suffices. The fraction of the aqueous polymer phase can accordingly be above the region of "closest spherical packing" (74 volume percent for the dispersed phase). This is possible since the suspended droplets are of different sizes and, on the other hand, can be deformed to non-spherical particles. The viscosity of such a dispersion is, naturally, high and can be, for example, about 1000 centipoises. If oils of medium or higher viscosity are employed as the continuous phase, the viscosity of the suspension reaches very much higher values, providing the fraction of the oil phase is not considerably increased. At the same time the oil phase is also thickened by the dispersing agent dissolved therein. Thickening increases the stability of the dispersion but should be kept within limits in order to insure the transportability of the dispersion. Viscosities of from 1000 to 20000 centipoises are the most advantageous.

In general, the aqueous polymer phase may comprise 90 to 30 parts by weight of the dispersion, of which 5 to 75 percent is polymer and 25 to 95 percent is water. The greater the amount of polymer phase compared with organic phase, the more polymer can be dispersed. For example, the content of the water-soluble polymer in the dispersion can exceed 50 percent by weight if the polymer phase is, for example, about 70 percent and the volume of the organic phase is restricted to a minimum.

The easy invertibility of the dispersions according to the present invention rests on the pH-dependent dispersing effect of the dispersing agents employed. The dispersing agent according to the invention is a copolymer of vinyl or vinylidene monomers having a basic nitrogen atom and of vinyl or vinylidene monomers having higher alkyl side chains. In addition, a further surface-active compound can be optionally employed in subordinate amounts to the extent that it does not take the HLB-value of the total dispersing agent present outside of the aforementioned limits. The dispersing effect of the aforementioned copolymers is attributable to the hydrophilic properties of the basic groups and to the hydrophobic properties of the higher alkyl chains. As is known, dispersing agents with a predominant hydrophobic portion are of the water-in-oil type, whereas those having a predominant hydrophilic portion are of the oil-in-water type. The relative importance of the different components of the dispersing agent is quantitatively measured by the so-called HLB-value (cf. The Atlas HLB-System, Vol. 4, 1963). Water-in-oil emulsifiers or dispersants have HLB-values below 10, whereas oil-in-water emulsifiers have HLB-values above 10. The dispersing agents contained in the dispersions of the present invention are so constituted that their hydrophilic portion is relatively weakly effective in the weakly acid, neutral, or alkaline region. However, its efficacy increases strongly in the strongly acid region. This change is attributable to salt formation at the basic nitrogen atom in the strongly acid region.

As vinyl monomers having basic nitrogen atoms, vinyl pyridine; vinyl imidazole; the dialkylaminoalkyl esters or dialkylaminoalkyl amides of acrylic acid or methacrylic acid, for example dimethylaminoethyl-acrylate or -methacrylate, diethylaminopropyl-acrylamide or -methacrylamide; and other acrylate and methacrylate esters of saturated or unsaturated heterocyclic compounds containing a basic nitrogen atom can be mentioned. In general, acrylate or methacrylate esters having from 4 to 10 carbon atoms and at least one tertiary nitrogen atom in the alcohol portion thereof are preferred.

As the hydrophobic components of the dispersing agent, esters of acrylic acid or methacrylic acid with alkanols having 6 or more, preferably 6 – 20, carbon atoms, such as hexanol, octanol, decanol, or of technical alcohol mixtures such as those commercially available under the tradename "Lorol", are preferred. In addition to such esters, up to 50 percent, by weight of the total hydrophobic component, of less hydrophobic comonomers such as styrene and the lower esters of acrylic acid or methacrylic acid can be employed.

The ratio of the amount of monomers with basic nitrogen groups to monomers having higher alkyl groups is so chosen that the HLB-value in the un-neutralized condition is below 6, preferably below 5, and is above 8 after conversion of the basic nitrogen atom into its salt form, preferably from 10 to 15. This condition is achieved with a content, in the copolymer, of 10 to 50 percent by weight of monomers having basic nitrogen atoms, particularly from 20 to 30 percent by weight.

The molecular weight of the copolymeric dispersing agent is preferably over 10000 in order to develop a good dispersing effect. In order not to thicken the organic phase in which the dispersing agent is dissolved, the molecular weight of the polymer is chosen so that the organic phase has a viscosity which does not exceed 20000 centipoises.

The amount of the polymeric dispersing agent in the organic phase can be between 2 and 20 percent, by weight of the organic phase.

The molecular weight of the dispersed polymer may be higher the lower its content, but is preferably above 10000.

The dispersions of the present invention are suitably prepared by dissolving the dispersing agent in the oil phase, or producing the dispersing agent in the oil phase by polymerization, distributing a concentrated aqueous monomer solution therethrough, and then bringing the batch to polymerization temperature. Depending on the desired particle size, the initiator is present in the monomer phase or in the oil phase. If desired, a portion of the water introduced with the monomer solution can be distilled off. The product obtained is almost unlimitedly storage-stable.

The size of the dispersed particles depends very essentially on the nature of the polymerization initiator. If a water-soluble initiator, such as potassium persulfate, is dissolved in the aqueous monomer phase, the polymerization takes place in the droplets of the monomer phase itself and the dispersed particles obtained essentially retain the form and size of the original droplets. The size of the droplets and, therefore, also the size of the particles of the polymer phase, are determined by the amount of the dispersing agent. At a content thereof from 5 – 20 percent, by weight of the monomer phase, particles within the particularly advantageous size range of from 10 microns to 50 microns are obtained. By reducing the amount of dispersing agent, the particle size can be raised to 1 mm or more. These dispersions might also be characterized as polymer "suspensions".

If a polymerization initiator soluble in the oil phase is employed, for example 2,2'-azobis-(ethylisobutyrate), considerably finer particles can be formed. In this case, the particle size is under 10 microns. These dispersions may also be designated as polymer "emulsions". Their behavior on solution in water, with inversion of the water-in-oil emulsifier into an oil-in-water emulsifier, corresponds with that of the suspensions described earlier herein.

Accordingly, the term "dispersions", as used in the present specification and claims is intended to include both suspensions and emulsions as described above comprising polymer particles within a broad size range.

At the place of use, the dispersion is suitably run into a large mixing container filled with water and is acidified with stirring. A strong mineral acid such as hydrochloric acid, sulfuric acid, ammonium bisulfate, or phosphoric acid can be employed. The resulting emulsified oil phase present in the aqueous polymer solution does not interfere in many uses and as a result need not be separated. In some cases, the oil phase separates from the aqueous polymer solution on standing and can then be simply decanted. In other cases, it is possible to remove the organic phase by extraction with chlorohydrocarbons or to bind it to adsorbing agents.[+)]

[+) A further advantage is derived from using the aqueous polymer solutions prepared from the dispersions of the invention as flocculating or sedimentation agents. Contrary to anionic dispersing agents, the cationic dispersing agent will not interfere with the flocculation or sedimentation process because it is rapidly adsorbed to the surface of the particles to be flocculated or sedimented, which are usually negatively charged.]

The addition of an acid at the place where the dispersion is used requires special storage containers and dosage arrangements for the acid. If such arrangements are not available, it is advantageous if the dispersion itself contains the amount of a water-soluble acid necessary for inversion of dispersing agent into the oil-in-water type.

The amount of acid added is so measured that it can convert the basic nitrogen containing groups of the dispersing agent into the salt form and can thus transform the dispersing agent to the oil-in-water type. Thus, the amount of acid should be at least about equivalent to the basic nitrogen groups of the dispersing agent. As a rule, an excess of acid is not harmful.

The acid-containing polymer dispersion is prepared by adding the acid, or at least a considerable portion of the acid, to the dispersion after polymerization of the monomer is essentially completed. It cannot be readily determined in which way the dispersing agent is modified by the addition of acid to the dispersion. The fact that the dispersion remains stable and unchanged indicates that the dispersing agent continues to act as a water-in-oil emulsifier. On the other hand, in many cases a thickening effect is observed, which indicates that the acid at least partially reacts with the dispersing agents. Since this thickening effect is not observed with all acids, the kind of acid may also have an influence on the change in the condition of the dispersing agent. A conversion into an oil-in-water type emulsifier is in any case achieved at the latest on combination with water.

As the acid additive, practically every water-soluble inorganic or organic acid can be employed, such as the hydrohalic acids, sulfuric acid, phosphoric acid, p-toluene sulfonic acid, diphenyl phosphinic acid, acetic acid, chloroacetic acid, and the like. Among these acids, the inorganic acids produce a pronounced thickening effect which can be desirable for improving the storage stability of the polymer dispersion. However, if the dispersion — particularly if it has a high content of polymer phase — already has a high viscosity before acid addition, a further increase in viscosity by the addition of acid is undesirable since the transport and dosing of the dispersion, as well as its distribution in water on solution, can be made more difficult. In these cases, water-soluble organic acids are preferred since they effect a weaker increase in viscosity, or no viscosity increase. Among these latter acids, the organic carboxylic acids can be mentioned, particularly those having no more than 4 carbon atoms such as formic acid, acetic acid, propionic acid, isobutyric acid, chloracetic acid, glycolic acid, acrylic acid, methacrylic acid, maleic acid, and fumaric acid. Further, organic sulfonic acids, such as benzene sulfonic acid or p-toluene sulfonic acid, as well as organic phosphonic and phosphinic acids such as diphenyl phosphinic acid, should be mentioned. These acids can be dissolved or emulsified in the organic phase of the polymer dispersions according to the invention. For this reason, those water-soluble organic acids which are soluble in the organic phase in at least the required amounts are fundamentally preferred.

As already mentioned above, or part of the acid, can also be present in the polymer phase. In this case the acid should be as little soluble in the organic phase as possible, such as are inorganic mineral acids. These acids are suitably added to the aqueous monomer solution during the preparation of the polymer phase. In this form, the acid does not exhibit any thickening effect. Preferably, only a portion of the required amount of acid, for example from 5 to 50 percent, is contained in the polymer phase and the remaining portion is in the organic phase.

The invention has its greatest significance for water-soluble polymers of extremely high molecular weight. Whereas polymers of low molecular weight, i.e. up to about 50000, such as are used as sizing agents for example, are still flowable at a polymer content of from 10 to 30 percent by weight, polymers with molecular weights over 1,000,000, preferably over 5,000,000, are used as flocculating agents or sedimentation auxiliaries. Even a 5 percent solution of such a polymer is no longer flowable, so that aqueous storage solutions of about 1 percent dry solids content must be prepared. Suspensions of water-soluble polymers having a molecular weight over 1,000,000 therefore constitute a preferred embodiment of the invention.

The foregoing description and the following Examples describe the embodiments of the invention most suitable for the overwhelming majority of the fields of use. Nevertheless, it will be apparent to one skilled in the art that numerous modified embodiments are conceivable which, in the usual case, offer no particular advantage but nevertheless solve the problem to which the present invention is directed. These embodiments, to the extent that they make use of the teachings of the present invention, are encompassed within the invention. Such embodiments can serve to solve additional problems and, for example, comprise the use of additives which are without significance for the conversion of a dispersed polymer into an aqueous solution, such as dyestuffs, aromatic agents, disinfecting agents, and the like.

Instead of mineral oils, i.e. aliphatic, aromatic, or mixed aromatic-aliphatic hydrocarbons or chlorohydrocarbons, the oil phase can comprise all organic liquids which are water-immiscible or at least only partially miscible with water, which are also not solvents for the suspended polymers, and, preferably, which are also not solvents for the monomers present in the polymers.

The polymer phase need not be prepared in every case in the presence of the oil phase and of the dispersing agent. It can be prepared by a polymerization in aqueous or aqueous alcoholic solutions or in acetone-water mixtures, and optionally can even be prepared in the absence of water. In this way it is possible to use monomers which would otherwise dissolve in the organic phase. After polymerization, such a polymer solution can be dispersed in an organic phase containing the dispersing agent, and water or organic solvent can at least partially be removed by distillation.

The copolymers used as the dispersing agents can be prepared directly in the oil phase by copolymerization and in this case are present as statistical copolymers. Nevertheless, other known polymerization techniques can be employed in which hydrophilic and hydrophobic monomer units are arranged in different portions of a block copolymer or graft copolymer.

The copolymers are sufficiently effective, in the polymerization of the dispersed aqueous monomer solution, in the storage of the polymer dispersion over a long period of time, and for emulsification of the oil phase after the inversion of the dispersion, that the addition of further surface-active materials is not necessary. However, if further surface-active substances are employed, then they must either undergo the same change in their HLB-value on acidification as does the macromolecular dispersing agent or they may be added only in such amounts that the total of the emulsification-active substances, on shifting the pH value from above 4 to below 2 must undergo a change in the HLB-value from a value below 6 to a value above 8.

As a rule, it is unimportant which acid is employed for acidification, providing that it is strong enough to raise the HLB-value of the emulsifying agent above 8. This value can in certain cases be achieved even at a pH value above 2. In addition to the aforementioned mineral acids, numerous other inorganic and organic acids or acid salts can be used for reversal of the dispersion, among which hydrobromic acid, nitric acid, perchloric acid, formic acid, the various chloroacetic acids, p-toluene sulfonic acid, and ammonium bisulfate can be mentioned.

A variety of further modifications within the scope of the invention will be self-evident to one skilled in the art. This is true also for the use of the dispersions or the solutions obtained therefrom in all of those fields in which aqueous, particularly acid aqueous polymer solutions, are employed. It should not remain unmentioned that in many cases the acid polymer solution, after inversion of the dispersion, can be neutralized and freed by filtration from dispersing agent which may precipitate therefrom.

A better understanding of the present invention and of its many advantages will be had by referring to the following specific examples, given by way of illustration. In the examples, a number of different dispersing agents are employed. Their preparation is described immediately below.

Preparation of Dispersing Agent (A)

100 parts of paraffin oil having a viscosity of 3 centistokes/100°C. (commercially available under the tradename "Isopar M") are introduced into a reaction vessel having a reflux condenser and stirrer and warmed to 80°C. During the course of four hours, the following monomer mixture is added thereto:

260 parts of methacrylic alkyl esters having from 12 – 18 (average 15) carbon atoms in the alkyl portion;
34 parts of methyl methacrylate;
126 parts of 2-dimethylaminoethyl methacrylate; and
42 parts of 2,2'-azobis-(ethylisobutyrate).

After the addition, the mixture is stirred for a further 12 hours at 80°C. and then heated subsequently for one additional hour at 100°C. A highly viscous solution having a polymer content of 70 percent is formed.

Preparation of Dispersing Agent (B)

180 parts of mineral oil having a viscosity of 3.9 centistokes/100°C. (commercially available as "Schindler Oil AF 1") are introduced into a reaction vessel having a reflux condenser and stirrer and are heated to 80°C. After the addition of 2.1 parts of 2,2'-azobis-(ethylisobutyrate), the following monomer mixture is introduced over a four-hour period:

260 parts of methacrylic acid alkyl esters having 12 – 18 (average 15) carbon atoms in the alkyl portion thereof;
34 parts of methyl methacrylate;
126 parts of 2-dimethylaminoethyl methacrylate;
42 parts of tert.-dodecyl mercaptan; and
18.9 parts of 2,2'-azobis-(ethylisobutyrate).

After the addition is completed, the mixture is stirred for a further 12 hours at 80°C. A highly viscous solution having a polymer content of 70 percent is obtained.

Preparation of Dispersing Agent (C)

180 parts of mineral oil having a viscosity of 3.9 centistokes at 100°C. (commercially available under the tradename "Schindler Oil AF 1") are introduced into a reaction vessel equipped with a reflux condenser and stirrer and are warmed to 80°C. After the addition of 2.1 parts of 2,2'-azobis(ethylisobutyrate), the following monomer mixture is introduced over a period of four hours:

315 parts of decyl methacrylate;
105 parts of 2-diethylaminoethyl methacrylate;
42 parts of tert.-dodecyl mercaptan; and
18.9 parts of 2,2'-azobis-(ethylisobutyrate).

After the addition, the mixture is stirred for a further 12 hours at 80°C. A highly viscous solution having a polymer content of 70 percent is obtained.

Preparation of Dispersing Agent (D)

120 parts by weight of mineral oil having a viscosity of 3.9 centistokes at 100°C. (commercially available as "Schindler Oil AF 1") and 2.8 parts of 2,2'-azobis-(ethylisobutyrate) are introduced into a reaction vessel having a reflux condenser and stirrer and the mixture is warmed to 80°C. The following mixture is then introduced over a period of 4 hours:

1000 parts of mineral oil (3.9 centistokes/100°C.);
196 parts of methacrylic acid alkyl esters having 12 – 18 (average 15) carbon atoms in the alkyl portion thereof;
40 parts of dimethylaminoethyl methacrylate;
44 parts of N-vinyl imidazole; and
25.2 parts of azobis-(ethylisobutyrate).

Subsequently, the mixture is stirred for a further 16 hours at 80°C. and for 2 hours at 100°C. A solution of low viscosity having a polymer content of 20 percent is obtained. This solution can be used directly as the oil phase for the preparation of a dispersion.

Preparation of Dispersing Agents (E) – (I)

E. 120 parts by weight (pbw) of mineral oil (1.15 cP, 100°) are introduced into a reaction vessel equipped with a stirrer, thermometer and dropping funnel and heated to 80°C. 2.8 pbw of 2,2-azobis-(ethylisobutyrate) are added. Within 4 hours, a monomer mixture of 212 pbw of an alkyl methacrylate containing from 12 to 18 carbon atoms in the alkyl group, the average being at 15 carbon atoms
40 pbw of methyl methacrylate
28 pbw of N-Vinyl-imidazole
25.2 pbw of 2,2'-azobis-(ethyl isobutyrate)

is added dropwise over a 4 hour period. After addition is complete, the polymerization is concluded by heating for 12 hours to 80°C with stirring. A highly viscous polymer solution having a 70 % by weight polymer content is obtained.

F. According to the procedure described above a polymer solution is prepared from a monomer mixture of 200 pbw of an alkyl methacrylate as described in (E)
38 pbw of methyl methacrylate
14 pbw of N-vinyl-imidazole
42 pbw of 2-(1-imidazolyl)-ethyl methacrylate
25.2 pbw of 2,2'-azobis-(ethyl isobutyrate)

G. According to the procedure described in (E) a polymer solution is prepared from a monomer mixture of 182.3 pbw of an alkyl methacrylate as used in (E)
13.7 pbw of methyl methacrylate
84 pbw of dimethylamino-ethyl methacrylate
25.2 pbw of 2,2'-azobis-(ethyl isobutyrate)

H. According to the procedure described in (E) a polymer solution is prepared from a monomer mixture of 156 pbw of an alkyl methacrylate as used in (E)
12 pbw of methyl methacrylate
112 pbw of (N-methyl-piperidinyl-2)-methacrylate
25.2 pbw of 2,2'-azobis-(ethyl isobutyrate)

I. According to the procedure described in (E) a polymer solution is prepared from a monomer mixture of 182.3 pbw of an alkyl methacrylate as used in (E)
13.7 pbw of methyl methacrylate
42 pbw of β-N-morpholino-ethyl methacrylate
42 pbw of N-vinyl-pyridine
25.2 pbw of 2,2'-azobis-(ethyl isobutyrate)

EXAMPLE 1

Preparation of a Dispersion 110 parts of mineral oil having a viscosity of 1.15 centistokes/100°C. (commercially available as "Shell Oil 1022") are introduced into a reaction vessel provided with a reflux condenser and stirrer and are then combined with 40 parts of dispersing agent solution (A). The organic phase is heated to 70°C. and the following aqueous phase is then added over a period of 1.5 hours:

84 parts of acrylamide;
196 parts of 2-methacryloxyethyl-trimethyl-ammonium chloride;
120 parts of water; and
0.7 part of the sodium salt of 4,4'-azobis-(4-cyanovalerianic acid).

After the addition, the temperature rises briefly to 90°C. The mixture is stirred for a further 2 hours at 80°C. The viscosity of the stable milky dispersion is 6100 centipoises (Brookfield, Spindle III/6rpm/20°C.).

Conversion to an Aqueous Solution 1.96 parts of the dispersion obtained above are briefly stirred into 98.04 parts of distilled water. Then, 0.8 part of 1 percent sulfuric acid is introduced dropwise and the mixture is stirred further. The suspended polymer dissolves after a few minutes and forms a 1 percent aqueous solution having a viscosity of 6800 centipoises (Brookfield, Spindle III/6 rpm/20°C.).

EXAMPLE 2

Preparation of a Dispersion 176 parts of mineral oil having a viscosity of 3.9 centistokes/100°C. (commercially available as "Schindler Oil AFl") are introduced into a reaction vessel equipped with a reflux condenser and stirrer and are combined with 40 parts of dispersing agent solution (B). The organic phase is warmed to 70°C. and the following aqueous phase is added over a period of 1 hour:

140 parts of acrylamide;
40 parts of 2-methacryloxytethyl-trimethyl-ammonium chloride;
120 parts of water; and
0.7 part of the sodium salt of 4,4'-azobis-(4-cyanovalerianic acid).

After the addition is complete, the temperature rises briefly to 80°C. After a further stirring for 2 hours at 80°C. the polymerization batch is cooled. The viscosity of the stable milky dispersion is 1100 centipoises (Brookfield, Spindle II/6 rpm/20°C.

Conversion to an Aqueous Solution 2.2 parts of the dispersion as prepared above are briefly stirred into 97.8 parts of distilled water. Then, 0.8 part of 1 percent sulfuric acid is added dropwise and the mixture is stirred further. After a few minutes, a 1 percent aqueous solution having a viscosity of 4000 centipoises (Brookfield, Spindle III/6 rpm/20°C.) is formed.

EXAMPLE 3

Preparation of a Dispersion

The following monomer mixture is introduced with vigorous stirring into 15 parts of mineral oil (commercially available under the tradename "Shell Oil 1022") and 6.7 parts of dispersing agent (A) over a period of one hour at 80°C.:
 38.3 parts of water;
 28.0 parts of 2-methacryloxyethyl-trimethylammonium chloride;
 12.0 parts of acrylamide; and
 0.0012 part of 4,4'-azobis-(4-cyanovalerianic acid).

The monomer mixture is adjusted to a pH of 2 with sulfuric acid. 3 hours after conclusion of the monomer addition, 0.53 part of acetic acid is added to the still-warm batch, which is then left to cool. The organosol obtained has a viscosity of 12000 centipoises. On stirring in water it dissolves immediately and forms, for example, a 1 percent solution having a viscosity of 3000 centipoises.

EXAMPLE 4

The process of Example 3 is repeated, but the monomer solution is adjusted to a pH of 4.2. The organosol formed has a viscosity of 13000 centipoises. It dissolves in water somewhat more slowly than the organosol of Example 3. A 1 percent aqueous solution has a viscosity of 2800 centipoises. If the organosol contains 0.8 part of acetic acid (instead of 0.53 part), the rate of solution is clearly increased.

EXAMPLE 5

The procedure of Example 3 is repeated, but the monomer mixture is adjusted to a pH of 1 and there is no addition of acetic acid. The resulting organosol has a viscosity of 2000 centipoises. It dissolves easily in water and, for example, forms a 1 percent aqueous solution having a viscosity of 2700 centipoises. If 0.26 part of acetic acid is additionally added to the organosol, the 1 percent solution obtained has a viscosity of 3700 centipoises.

EXAMPLE 6

Example 3 is repeated with the difference that, in place of the 4,4'-azobis-(4-cyanovalerianic acid) dissolved in the monomer phase, a similar amount of 2,2'-azobis-(ethylisobutyrate) is dissolved in the oil phase. An organic dispersion is formed which contains considerably finer particles in comparison with the dispersion of Example 3.

On dissolving in water, a 1 percent aqueous solution having a viscosity of 5500 centipoises is obtained.

EXAMPLE 7

80 parts of mineral oil having a viscosity of 1.15 centipoises at 100°C. (commercially available as "Shell Oil 1022") and 34 parts of the dispersing agent solution (A) are introduced into a reaction vessel having a reflux condenser and stirrer. The vessel is degassed and warmed to 80°C. The following monomer solution is then introduced over a one-hour period:
 94 parts of water;
 206 parts of dimethylaminoethyl methacrylate;
 0.62 part of 4,4'-azobis-(4-cyanovalerianic acid); and
 100 parts of 10 percent hydrochloric acid.

One hour after conclusion of the addition, 0.3 part of 2,2'-azobis-(ethylisobutyrate) is added for completion of the polymerization. A very vigorous stirring is essential for the stability of the suspension. After a further three hours, the mixture is cooled. The suspension so obtained can be converted to an aqueous solution after mixing with water and addition of sulfuric acid.

EXAMPLE 8

85 parts of mineral oil having a viscosity of 1.15 centipoises at 100°C. (commercially available as "Shell Oil 1022") and 29 parts of dispersing agent (C) are introduced into a reaction vessel having a reflux condenser and stirrer. The vessel is degassed and warmed to 80°C. The following monomer solution is then introduced over a period of one hour:
 194 parts of water;
 180 parts of N-vinyl pyrrolidone;
 26 parts of vinyl sulfonate; and
 0.01 part of 4,4'-azobis-(4-cyanovalerianic acid).

Polymerization and working up follow as in Example 7.

EXAMPLE 9

187 parts of mineral oil having a viscosity of 1.15 centipoises at 100°C. (commercially available as "Shell Oil 1022") and 44.1 parts of dispersing agent solution (A) are introduced into a reaction vessel equipped with a reflux condenser and stirrer. The vessel is degassed and warmed to 80°C. The following monomer solution is then added over a period of 1 hour:
 103 parts of methacrylic acid;
 103 parts of sodium methacrylate;
 194 parts of water; and
 0.412 part of 4,4'-azobis-(4-cyanovalerianic acid).

Polymerization and working up are as in Example 7.

EXAMPLE 10

Example 3 is repeated with the difference that, after the conclusion of polymerization, 0.8 part of concentrated hydrochloric acid (32 percent) is added instead of acetic acid. The viscosity of the suspension is 4800 centipoises. After mixing with water, a 1 percent polymer solution having a viscosity of 3700 centipoises is obtained.

EXAMPLE 11

Example 3 is repeated with the difference that, instead of 15 parts of oil, only 10.0 parts of oil are added and the amount of water is raised from 38.3 parts to 43.3 parts. The suspension obtained, having only a 12 percent oil content, is still flowable and has a viscosity of 74000 centipoises.

EXAMPLE 12

Example 3 is repeated with the difference that dispersing agent (D) is employed instead of agent (A). No differences are observed in a comparison with Example 3. The dispersion, however, is soluble in water without the addition of acetic acid.

EXAMPLE 13

250 parts of a 20 percent solution of gelatin in water are stirred at 70°C. into a solution of 20.8 parts of dispersing agent (A) in 400 parts of mineral oil having a viscosity of 1.15 centipoises at 100°C. ("Shell Oil 1022"). The flowable suspension obtained after cooling can be converted to an aqueous solution by acid addition (3 parts of sulfuric acid).

EXAMPLE 14

445 parts of a 10 percent aqueous solution of polyvinyl alcohol (commercially available as "Polyviol 48/20") are homogenized at 20°C. in a mixture of 100 parts of mineral oil having a viscosity of 1.15 centipoises at 100°C. ("Shell Oil 1022"), 12.7 parts of dispersing agent (A), and 15 parts of hexane. 300 parts of water are azeotropically distilled off with hexane, with reintroduction of the hexane. The dispersion obtained can be converted to an aqueous solution by acid addition.

EXAMPLES 15–19

85 parts by weight (pbw) of a mineral oil (1.15 cP/100°C, trade name "Shell Oil 1022") and 29 pbw of the following emulsifying polymer solutions

| Example 15 | Dispensing agent (E) |
| Example 16 | Dispensing agent (F) |
| Example 17 | Dispensing agent (G) |
| Example 18 | Dispensing agent (H) |
| Example 19 | Dispensing agent (I) | are introduced into a reaction vessel equipped with a reflux condenser, a stirrer and a dropping funnel. A monomer solution comprising 194 pbw of water
61.8 pbw of acrylamide
144.2 pbw of trimethyl-$\beta$-methacryloxyethylammonium chloride
0.062 pbw of 2,2'-azobis-(ethyl isobutyrate) and enough sulfuric acid to attain pH 2 is added dropwise over a period of two hours. Three hours after addition of the monomer solution is complete, 1.65 pbw of concentrated hydrochloric acid are stirred into the reaction mixture which has been kept at 80°C all the time. Then the mixture is cooled to room temperature. The suspensions obtained in Examples 15 to 19 are instantly soluble in water.

EXAMPLE 20

The procedure of Example 3 is repeated with the difference that instead of 4.3 parts by weight of dispersing agent (A) there is used a mixture of 3 parts by weight of dispersing agent (A) and 1.7 parts by weight of sorbitan monooleate. The resulting suspension is stable and, after addition of acetic acid, instantly soluble in water.

What is claimed is:
1. A polymer dispersion comprising
A. 10 to 70 parts by weight of a continuous liquid organic phase, immiscible or only partially miscible with water, having dissolved therein from 2 to 28 percent, by weight of phase (A), of a water-in-oil dispersing agent which has an HLB-value below 6 at a pH above 4 and an HLB-value above 8 at a pH below 2, has a molecular weight above 10,000, and which is a copolymer of
   1. 10 to 50 percent, by weight of said copolymer, of a vinyl or vinylidene monomer having a basic nitrogen atom, and
   2. 90 to 50 percent, by weight of said copolymer, of
      a. an acrylic acid ester or methacrylic acid ester of an alcohol having from 6 to 20 carbon atoms; or
      b. a mixture of at least one monomer as in (a) with up to an equal amount by weight of at least one different water-insoluble vinyl or vinylidene monomer;
B. 90 to 30 parts by weight of an aqueous phase, finely-divided in phase (A), comprising
   1. 5 to 75 percent, by weight of phase (B) of a water-soluble polymer dissolved in or swollen with
   2. 95 to 25 percent, by weight of phase (B), of water; and
C. a water-soluble acid in an amount at least equivalent to the basic nitrogen atoms in (A)(1); said phases (A) and (B) together making up 100 parts by weight and having at most a small density difference.

2. A polymer dispersion as in claim 1 wherein said water-soluble acid is an organic acid.

3. A polymer dispersion as in claim 2 wherein said water-soluble organic acid is a carboxylic, sulfonic, phosphonic, or phosphinic acid.

4. A polymer dispersion as in claim 1 wherein said water-soluble acid is present in said liquid organic phase.

5. A polymer dispersion as in claim 1 wherein said water-soluble acid is present in an amount which is at least about equivalent to the basic nitrogen atoms present in said dispersing agent.

6. A polymer dispersion as in claim 1 wherein a further, different, surface-active agent is present together with said dispersing agent and the HLB-value of the combined dispersing agents is below 6 at a pH value above 4 and is above 8 at a pH value below 2.

7. A polymer dispersion as in claim 1 wherein component (C)(1) of said dispersing agent is an ester of acrylic acid or methacrylic acid having 4 to 10 carbon atoms and at least one tertiary nitrogen atom in the alcohol portion thereof, and component (C)(2) is
   a. at least one alkyl ester of acrylic acid or methacrylic acid having 6 to 20 carbon atoms in the alkyl portion thereof, or
   b. a mixture of at least one ester as in (a) with up to an equal amount by weight of an alkyl ester of acrylic acid or methacrylic acid having fewer than 6 carbon atoms in the alkyl portion thereof.

8. A polymer dispersion as in claim 1 wherein said water-soluble polymer is a homopolymer or copolymer of vinyl or vinylidene monomers.

9. A polymer dispersion as in claim 1 wherein said water-soluble polymer is a water-soluble homopolymer or copolymer of at least one monomer selected from the group consisting of acrylamide, methacrylamide, acrylic acid and methacrylic acid and their water-soluble salts, vinyl pyrrolidone, $C_1 - C_4$ hydroxyalkyl esters of acrylic acid and methacrylic acid, $C_1 - C_4$ dialkylamino - $C_2 - C_4$ alkyl esters of acrylic acid and methacrylic acid and their water-soluble acid salts and quaternary ammonium salts, vinyl sulfonic acid and styrene sulfonic acid and their water-soluble salts.

10. The method of making an aqueous solution of a water-soluble polymer which comprises combining a polymer dispersion as in claim 1 with water.

11. The method of making a polymer dispersion as in claim 1 which comprises dispersing 90 to 30 parts by weight of an aqueous phase containing a polymerizable monomer in 10 to 70 parts by weight of a liquid organic phase immiscible or only partially miscible with water, in the presence of a free-radical polymerization initiator, initiating polymerization of said polymerizable monomer to form a polymer dispersion, and then adding a water-soluble acid to the polymer dispersion so formed, said aqueous phase comprising 95 to 25 percent, by weight of said aqueous phase, of water and 5 to 75 percent, by weight of said aqueous phase, of at least one vinyl or vinylidene monomer, which monomer or monomer mixture, when polymerized, forms a water-soluble or water-swellable polymer, said liquid organic phase being defined as in claim 1(A), said water-soluble acid being added in an amount at least equivalent to the basic nitrogen atoms in 1(A)(1), and said aqueous phase and liquid organic phase together making up 100 parts by weight and having at most a small density difference.

12. The method of making a polymer dispersion as in claim 1 which comprises dispersing 90 to 30 parts by weight of an aqueous phase containing a polymerizable monomer in 10 to 70 parts by weight of a liquid organic phase immiscible or only partially miscible with water, in the presence of a free-radical polymerization initiator and of a water-soluble acid, and then initiating polymerization of said polymerizable monomer to form a polymer dispersion, said aqueous phase comprising 95 to 25 percent, by weight of said aqueous phase, of water and 5 to 75 percent, by weight of said aqueous phase, of at least one vinyl or vinylidene monomer, which monomer or monomer mixture, when polymerized, forms a water-soluble or water-swellable polymer, said liquid organic phase being defined as in claim 1(A), said water-soluble acid being present in an amount at least equivalent to the basic nitrogen atoms in 1(A)(1), and said aqueous phase and liquid organic phase together making up 100 parts by weight and having at most a small density difference.

* * * * *